United States Patent
Katayama et al.

(10) Patent No.: US 6,529,535 B2
(45) Date of Patent: Mar. 4, 2003

(54) LASER DIODE MODULE

(75) Inventors: Etsuji Katayama, Tokyo (JP); Yuichiro Irie, Tokyo (JP); Jun Miyokawa, Tokyo (JP); Akira Mugino, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/772,874

(22) Filed: Jan. 31, 2001

(65) Prior Publication Data

US 2002/0003818 A1 Jan. 10, 2002

(30) Foreign Application Priority Data

Feb. 1, 2000 (JP) ......................................... 2000-028932

(51) Int. Cl.7 .............................. H01S 5/00; H01S 3/04; H01S 3/13; G02B 6/32
(52) U.S. Cl. ..................... 372/36; 372/29.02; 372/43; 385/33
(58) Field of Search .............................. 372/29.02, 36, 372/50, 43; 385/31, 33, 34, 35

(56) References Cited

U.S. PATENT DOCUMENTS

| | | | |
|---|---|---|---|
| 3,910,677 A | * 10/1975 | Becker et al. ................ 385/33 |
| 4,329,659 A | * 5/1982 | Chen ............................ 372/29 |
| 5,446,816 A | * 8/1995 | Shiraishi et al. .............. 385/33 |
| 5,546,212 A | 8/1996 | Kunikane et al. ............ 359/163 |
| 5,668,826 A | 9/1997 | Bezinge et al. ............... 372/32 |
| 5,799,030 A | 8/1998 | Brenner ........................ 372/50 |
| 5,845,024 A | * 12/1998 | Tsushima et al. ............. 385/33 |
| 6,081,637 A | * 6/2000 | Rekow ......................... 385/31 |
| 6,081,638 A | * 6/2000 | Zhou ............................ 385/31 |
| 6,301,406 B1 | * 10/2001 | Irie et al. ...................... 385/33 |

FOREIGN PATENT DOCUMENTS

JP  63-318508 A  * 12/1988  ................. 385/34

* cited by examiner

*Primary Examiner*—Quyen Leung
(74) *Attorney, Agent, or Firm*—Oblon, Spivak, McClelland, Maier & Neustadt, P.C.

(57) ABSTRACT

There is provided a semiconductor laser device capable of increasing the optical output. The semiconductor laser module comprises a semiconductor laser device (1), an optical fiber (2) that receives light emitted from the semiconductor laser device (1) and a photo diode (3) that monitors optical output of the semiconductor laser device (1). The optical fiber (2) is a lensed fiber having a wedge-shaped lens on its tip and the photo diode (3) placed in the vicinity of the laser light receiving end (2*a*) of the semiconductor laser device (1) receives reflected light from a reflection surface (2*a*$_1$) and monitors the optical output of the semiconductor laser device (1).

10 Claims, 4 Drawing Sheets

LASER DIODE MODULE

BACKGROUND OF THE INVENTION

1. Field of the Invention

The present invention relates to a semiconductor laser module that is used for optical communication and so on.

2. Description of the Related Art

A development of a high power semiconductor laser module as an exciting light source and the like in an amplifier for an optical fiber that is used for optical communication is in progress.

A conventional semiconductor laser module comprises, as is shown in FIG. 6, for example, a semiconductor laser device 1, an optical fiber 2 that receives laser light emitted from the semiconductor laser device 1 and a photo diode 3 that monitors optical output of the semiconductor laser device 1. These semiconductor laser device 1, optical fiber 2 and photo diode 3 are housed in a package 10.

The semiconductor laser device 1 is optically coupled at its front facet 1a (emitting facet) side with the optical fiber 2 and is confronted at its rear facet 1b (reflecting facet) side with the photo diode 3. An anti-reflection coating film whose reflectance is, for example, around several percent is provided on the front facet 1a of the semiconductor laser device 1 and a reflection coating film whose reflectance is, for example, around 90 percent is provided on the rear facet 1b.

The semiconductor laser device 1 is fixed to a base (a base part) 6 via a heat sink 9 and a fixing part 5, and the photo diode 3 is fixed to the base 6 by a photo diode fixing part 8.

In the semiconductor laser module shown in FIG. 6, ferules 11a, 11b are provided while keeping a distance from each other in the lengthwise direction of the optical fiber 2, which is inserted and fixed in these ferules 11a, 11b. The ferule 11a functions as a means for supporting the optical fiber and is made of a Kovar (Trade mark) that is a Fe—Ni—Co alloy, for example.

The base 6 is fixed on a thermomodule 7 and the thermomodule 7 is mounted on a bottom board 10a of the package 10. Here, as is shown in FIG. 6, the thermomodule 7 generally comprises a base-side board 17, a bottom board-side board 18 and a peltier cooler (a peltier device) 19 pinched between these boards 17 and 18. Both the base-side board 17 and the bottom board-side board 18 of the thermomodule 7 are made of $Al_2O_3$. And the ferule 11b is fixed to a side-wall of the package 10.

In the above mentioned semiconductor laser module, the semiconductor 1 and the optical fiber 2 are aligned, and laser light emitted from the front facet 1a of the semiconductor laser device 1 is received by the optical fiber 2 to be transmitted in the optical fiber 2 and is provided for a desired use.

Further, in the above mentioned semiconductor laser module, an optical output from the rear facet 1b of the semiconductor laser device 1 is monitored by the photo diode 3, thereby the optical output from the front facet 1a of the semiconductor laser device 1 is controlled. In other words, the output from the emitting facet of the optical fiber 2 is controlled by controlling the laser output based on the monitoring of the photo diode 3.

Here, as the above mentioned semiconductor laser module monitors the optical output from the rear facet 1b of the semiconductor laser device 1 by the photo diode 3, it is needed to permit light having a certain intensity to be emitted from the rear facet 1b of the semiconductor laser device 1 and to reach to a light receiving surface of the photo diode 3. For that purpose, normally, the reflectance of the rear facet 1b of the semiconductor laser device 1 is reduced to a certain extent, for example, to 90 percent or less, intentionally.

However, when the reflectance of the rear facet 1b (reflecting facet) of the semiconductor laser device 1 is reduced, there exists a problem in that an optical output form the front facet 1a of the semiconductor laser device 1 decreases to reduce the optical output from the semiconductor laser module itself.

In recent years, another constitution for a semiconductor laser module has been proposed in which a fiber grating is provided on the optical fiber 2 of the semiconductor laser module. The fiber grating functions as a diffraction grating reflecting only light having a predetermined wavelength out of the laser beams that are emitted from the semiconductor laser device 1 and enter the optical fiber 2. Thus, the output wavelength of the semiconductor laser module is stabilized by providing the diffraction grating, such as a fiber grating, on the optical fiber 2.

However, in this constitution, as the polarization direction of the reflected light selected by the diffraction grating on the basis of the wavelength fluctuates by the change of the positional condition of the optical fiber 2, a returning light with a changed polarization direction is returned to the semiconductor laser device 1 from the front facet 1a of the semiconductor laser device 1 through the optical fiber 2, when the positional condition of the optical fiber 2 is changed. The power of the optical outputs from the front facet 1a and rear facet 1b of the semiconductor laser device 1 thus fluctuates. In particular, the amount of the fluctuation of the optical output by the above mentioned disturbance in the case of light emitted from the rear facet 1b of the semiconductor laser device 1 is bigger than that in the case of light emitted from the front facet 1a.

Accordingly, when the fiber grating is provided on the optical fiber 2 of the semiconductor laser device 1 shown in FIG. 6, it has been difficult to precisely conduct APC (Automatic Power Control) for controlling optical output from the front facet 1a of the semiconductor laser device 1 to a fixed value. Namely, in the constitution shown in FIG. 6, when the fiber grating is provided on the optical fiber 2 and the output light from the rear facet 1b of the semiconductor laser device 1 is monitored, the fluctuation of monitor current is so large that it was impossible to control the optical output from the front facet 1a of the semiconductor laser device 1 to a fixed value.

SUMMARY OF THE INVENTION

The present invention has been made to solve the above mentioned problems, and an object of the present invention therefore to provide a high power semiconductor laser module that can control the optical output to a fixed value.

In order to achieve the above-mentioned object, the present invention provides a semiconductor laser module with the following constitution.

According to a first constitution of the present invention, there is provided a semiconductor laser module comprising: a semiconductor laser device; an optical fiber that receives laser light emitted from the semiconductor laser device; and a photo diode monitoring an optical output of the semiconductor laser device, characterized in that the photo diode monitors an optical output of the semiconductor laser device by receiving scattered light at a laser light receiving end of the optical fiber.

A semiconductor laser module according to a second constitution of the present invention is characterized in that the reflectance at a facet opposite side to the optical fiber of the semiconductor laser device is set to 95 percent or more, in addition to the above mentioned first constitution.

Further, a semiconductor laser module according to a third constitution of the present invention is characterized in that the laser light receiving end of the optical fiber is formed into a lens, in addition to the above mentioned first constitution.

Further, a semiconductor laser module according to a forth constitution of the present invention is characterized in that light emitted from the semiconductor laser device is optically coupled to the laser light receiving end directly, in addition to the above mentioned first (third) constitution.

Further, a semiconductor laser module according to a fifth constitution of the present invention is characterized in that the laser light receiving end is formed into a wedge-shaped lens, in addition to the above mentioned third constitution.

Further, a semiconductor laser module according to a sixth constitution of the present invention is characterized in that the optical fiber includes a diffraction grating reflecting only light having a predetermined wavelength out of laser beams that are emitted from the semiconductor laser device and incident to the optical fiber, in addition to the above mentioned first constitution.

Further, a semiconductor laser module according to a seventh constitution of the present invention further comprises a base on which the semiconductor laser devise is mounted, and is characterized in that the optical fiber is placed such that a plane bisecting the wedge angle of the wedge-shaped lens is parallel to the base and that the photo diode is placed under the wedge-shaped lens, in addition to the above mentioned fifth constitution.

Further, a semiconductor laser module according to an eighth constitution of the present invention further comprises a base on which the semiconductor laser devise is mounted, and is characterized in that the optical fiber is placed such that a plane bisecting the wedge angle of the wedge-shaped lens is perpendicular to the base and that the photo diode is placed on a flank portion side of the laser light receiving end having the wedge-shaped lens, in addition to the above mentioned fifth constitution.

Further, a semiconductor laser module according to a ninth constitution of the present invention further comprises: a base on which the semiconductor laser device and the optical fiber are mounted; a fixing means for fixing the optical fiber to the base; a thermomodule on which the base is mounted; and a package housing the photo diode, the semiconductor laser device, the optical fiber, the fixing means, the base and the thermomodule, and is characterized in that: the thermomodule is mounted on a bottom board of the package; the thermomodule includes a base-side board, a bottom board-side board and a peltier cooler pinched between these boards; the base is composed of a laser device mounting member that is in contact with the thermomodule to mount the semiconductor laser device, and a fixing means mounting member that is placed on a position outside a semiconductor laser device mounting region of the laser device mounting member to mount the fixing means; and the laser device mounting member is made of a material having a coefficient of linear expansion within the range between the coefficient of linear expansion of the fixing means mounting member and the coefficient of linear expansion of the base-side board of the thermomodule, in addition to the above mentioned first constitution.

Further, a semiconductor laser module according to a tenth constitution of the present invention further comprises a base on which the semiconductor laser device and the optical fiber are mounted, and is characterized in that: the optical fiber is fixed to the base while being pinched by a fixing means from both flank portion sides; a package is provided for housing the photo diode, the semiconductor laser device, the base and the fixing means; a thermomodule is mounted on a bottom board of the package; the base is mounted on the thermomodule; a fixing means mounting portion mounting the fixing means is provided on the base; a first laser-welded portion formed by laser-welding the fixing means mounting portion and the fixing means and a second laser-welded portion formed by laser-welding the fixing means and an optical fiber supporting means are provided; and the first laser-welded portion and the second laser-welded portion are made to have approximately the same heights in the direction perpendicular to the bottom board of the package, in addition to the above mentioned first constitution.

Further, a semiconductor laser module according to an eleventh constitution of the present invention further comprises: a base mounting the semiconductor laser device and the optical fiber; a fixing means for fixing the optical fiber to the base; and a thermomodule mounting the base, and characterized in that wall portions are provided on the base at the both side of the frank portions of an optically-coupled portion interposed between a laser light-emitting facet of the semiconductor laser devise and a laser light receiving end of the optical fiber, in addition to the above mentioned first constitution.

Further, a semiconductor laser module according to a twelfth constitution of the present invention further comprises: a base mounting the optical fiber and the semiconductor laser device; a thermomodule mounting the base; and a package housing the photo diode, the semiconductor laser device, the optical fiber, the base and the thermomodule, and is characterized in that: the thermomodule is mounted on a bottom board of the package; the thermomodule includes a base-side board, a bottom board-side board and peltier cooler pinched between these boards; and the difference between the coefficient of linear expansion of base-side board and bottom board-side board and the coefficient of linear expansion of the bottom board of the package is $1 \times 10^{-6}$/K or less, in addition to the above mentioned first constitution.

In the present invention according to the above mentioned (first) constitution, a reflection surface is provided at the laser light receiving end of the optical fiber and the photo diode receives laser light (scattered light) reflected at the laser light receiving end of the optical fiber and monitors the optical output of the semiconductor laser module. Therefor the semiconductor laser module according to the present invention does not need to emit light from the rear facet of the semiconductor laser device (the facet on the side opposite to the optical fiber side), unlike the conventional modules.

Accordingly, the semiconductor laser module according to the present invention can increase the optical output of the semiconductor laser device and increase the optical output of the semiconductor laser module itself, as the reflectance at the rear facet of the semiconductor laser device can be increased.

Namely, the semiconductor laser module according to the present invention can, as in the above mentioned second constitution, increase the reflectance at the facet of the semiconductor laser device on the side opposite to the optical fiber to, for example, 95 percent or more, and can be a semiconductor laser module that can achieve a stable and high output.

As the third constitution of the present invention is provided with a lens (for example, wedge-shaped lens or spherical lens) at the laser light receiving end of the optical fiber and the laser light is optically coupled to the lens-like laser light receiving end, the efficiency in collecting light from the semiconductor laser device can be improved and the output of the semiconductor laser module can be increased even more.

Further, when the light emitted from the semiconductor laser device is optically coupled to the laser light receiving end directly, as in the forth constitution of the present invention, the improvement of the light coupling efficiency from the semiconductor laser device of the above mentioned third constitution is achieved effectively.

When the laser light receiving end is formed into a wedge-shaped lens, as in the fifth constitution of the present invention, the processing becomes relatively easy and the module can be applied, with a good collecting efficiency, even to a semiconductor laser device whose emission intensity distribution at its facet is not isotropic (for example, is elliptic). Further, with this constitution, the laser light can be reflected at slant surfaces of the wedge-shaped lens at the laser light receiving end of the optical fiber, and the inclination of the slant surfaces is large. Therefor, the separation distance between the light emitted from the semiconductor laser device and received at the laser light receiving end of the optical fiber and the scattered light that is the reflection of the received light can be small. Accordingly, in this constitution, the photo diode can be placed in the vicinity of the lensed fiber and the layout design is easy, even when a semiconductor laser device chip carrier and so on are placed together.

Further, in the semiconductor laser module, with a constitution in which, for example, a diffraction grating, such as, a fiber grating reflecting only light having a predetermined wavelength out of all the laser beams is provided on the optical fiber, the oscillation wavelength of the semiconductor laser module can be stabilized.

However, in the constitution in which a diffraction grating is provided on the optical fiber, although the laser output wavelength can be stabilized, there exists a possibility of generating return light, whose reflected light from the diffraction grating fluctuates in its intensity or whose polarization direction fluctuates. Then, in the constitution that a diffraction grating is provided on the optical fiber, the optical output of the semiconductor laser device fluctuates. Even in this case, however, the fluctuation of the optical output emitted from the semiconductor laser device to the optical fiber is smaller than the fluctuation of the light emitted from the rear facet of the semiconductor laser device. Accordingly, the semiconductor laser module of the present invention can easily be controlled by APD control, even when it has the constitution that the diffraction grating is provided on the optical fiber.

Further, by placing the optical fiber such that the plane bisecting the wedge angle of the wedge-shaped lens is parallel to the base mounting the semiconductor laser device and by placing the photo diode under the wedge-shaped lens, as in the seventh constitution of the present invention, the reflected light at the laser light receiving end of the optical fiber can be received and monitored effectively by the photo diode.

Further, by placing the optical fiber such that the plane bisecting the wedge angle of the wedge-shaped lens is perpendicular to the base mounting the semiconductor laser device and by placing the photo diode on the frank portion side of the laser light receiving end of the wedge-shaped lens, as in the eighth constitution of the present invention, the reflected light at the laser light receiving end of the optical fiber can be received and monitored effectively by the photo diode, as in the case of the seventh constitution.

Further, in the present invention, with the constitution that the base mounting the semiconductor laser device and the optical fiber comprises the laser devise mounting member and fixing means mounting member, and the laser device mounting member is made of a material having a coefficient of linear expansion within the range between the coefficient of linear expansion of the fixing means mounting member and the coefficient of linear expansion of the base-side board of the thermomodule mounting the base, the following effect can be obtained.

Namely, with this constitution, even when the thermomodule is bent due to a temperature change of the semiconductor laser module, the warp of the base can be relieved and the deterioration of efficiency of the optical coupling between the semiconductor laser device and the optical fiber due to the temperature change of the working environment can be restrained. Further, as the fluctuation of the light monitored by the photo diode (the reflected light from the optical fiber) is restrained, this constitution can provide a stable and high power semiconductor laser module.

Further, in the present invention, by setting the difference between the coefficient of linear expansion of the base-side board and the bottom board-side board and the coefficient of linear expansion of the bottom board of the package to $1\times10^{-6}$/K or less, the deterioration of efficiency of the optical coupling between the semiconductor laser device and the optical fiber due to the temperature change of the working environment can be restrained, and a more stable and high power semiconductor laser module can be obtained.

Further, in the present invention, with the constitution that the first laser-welded portion, which is formed by welding the fixing means mounting portion of the base and the fixing means for fixing the optical fiber supporting means with laser, and the second laser-welded portion, which is formed by welding the fixing means and the optical fiber supporting means with laser, have approximately the same height in the direction perpendicular to the bottom board of the package, the effect described below can be obtained.

Namely, with this constitution, even if the base is warped to a certain extent, the position of the optical fiber supporting means does not largely deviate with the first laser-welded portion functioning as a fulcrum, and accordingly, the deterioration of the efficiency of the optical coupling between the semiconductor laser device and the optical fiber can be effectively restrained and the fluctuation of monitoring value by photo diode can be restrained as well.

Further, in the present invention, with the constitution that wall portions are provided on the base on both side of the frank portions of an optically-coupled portion interposed between a laser light-emitting facet of the semiconductor laser devise and a laser light receiving end of the optical fiber, the effect described below can be obtained.

Namely, with this constitution, as the warp of the base at the optically-coupled portion between the semiconductor laser device and the optical fiber can be restrained by the wall portions, the deterioration of the efficiency of the optical coupling between the semiconductor laser device and the optical fiber can be effectively restrained and the fluctuation of monitoring value of light monitored by the photo diode can be restrained as well.

BRIEF DESCRIPTION OF THE DRAWINGS

Exemplary embodiments of the invention will now be described in conjunction with the drawings in which.

DETAILED DESCRIPTION OF THE PREFERRED EMBODIMENT

Embodiments of the present invention will now be described in detail with reference to the drawings.

Figure 1:
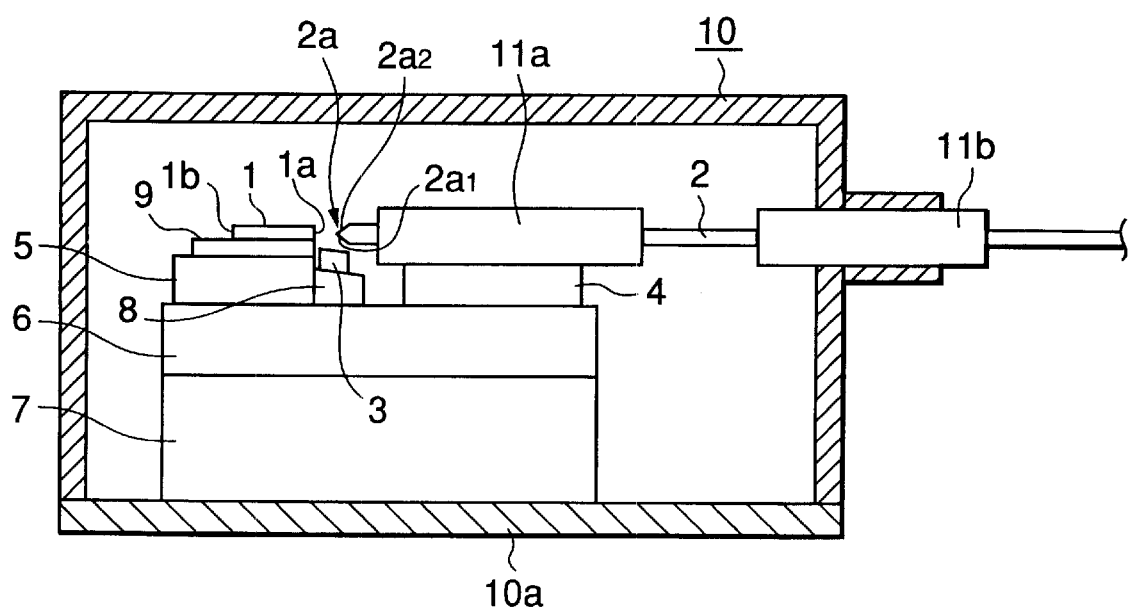
FIG. 1 is a sectional side view of a semiconductor laser module according to a first embodiment of the present invention.

FIG. 1 is a sectional side view of a semiconductor laser module according to a first embodiment of the present invention. In FIG. 1, identical reference numbers are used to indicate the parts having names identical with those in the conventional model shown in FIG. 6, and the explanation thereof is omitted or simplified.

Figures 2A, 2B:
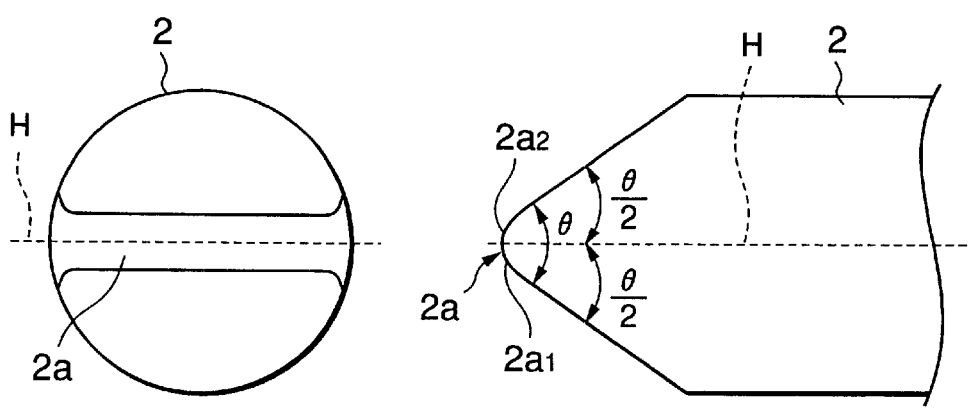
FIG. 2A is a front view of an end of an optical fiber used in the first embodiment of the present invention and FIG. 2B is a side view of the end of the optical fiber used in the first embodiment of the present invention.

In FIG. 1, the optical fiber 2 is a so-called lensed fiber, which is provided with a lens at its tip (having its tip processed into a lens). The laser light receiving end 2a of the optical fiber 2 is, as shown in FIGS. 2B and 2B, formed into a wedged shape. The slant surfaces constituting the lens are composed of the reflection surfaces $2a_1$ and $2a_2$ that have an effect of a lens collecting laser light and reflect a part of the received laser light. A radius of curvature R of the laser light receiving end 2a of the optical fiber 2 is, for example, 3 to 10 μm and a wedge angle θ is around 60 degree.

As mentioned above, the optical fiber 2 with the laser light receiving end 2 having a wedge-shaped lens can reflect a part of the output light of the semiconductor laser device 1 at the reflection surfaces $2a_1$ and $2a_2$ without impairing the optical coupling with the semiconductor laser 1 largely.

In this embodiment, the optical fiber 2 is placed such that a plane (imaginary plane) H bisecting the wedge angle θ of the wedge-shaped lens is parallel to the base 6, and is fixed on the fixing part 4 via the ferule 11a. And the photo diode 3 is placed under the wedge-shaped lens, i.e. at the opposing side to the reflecting surface $2a_1$.

The present embodiment is characterized, as opposed to the conventional model, in that the photo diode 3 directly receives the scattered light reflected at the laser light receiving end 2a of the optical fiber 2 and monitors the optical output of the semiconductor laser device 1. Namely, in the present embodiment, the photo diode 3 is provided in the vicinity of a region under the end portion 2a of the optical fiber 2, and light emitted from the front facet 1a (emitting facet) of the semiconductor laser device 1 is partially reflected at the reflection surface $2a_1$ that is the lower side end surface of the laser light receiving end 2a of the optical fiber 2, and the reflected light is received by the photo diode 3.

In this embodiment, with this constitution, as it is no more needed to emit light for monitoring from the rear facet 1b (reflection facet) of the semiconductor laser device 1, the reflectance of the rear facet 1b of the semiconductor laser device 1 is set to 95 percent or more.

Figure 6:
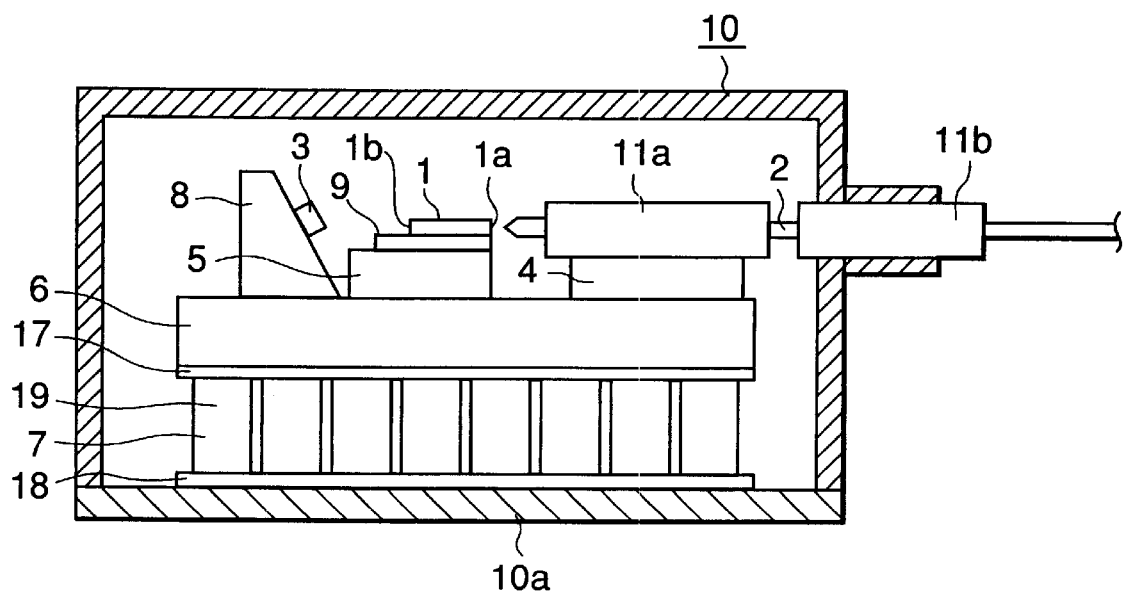
FIG. 6 is a sectional side view of a conventional semiconductor laser module.

The constitution of this embodiment other than those described above is identical with the conventional semiconductor laser module illustrated in FIG. 6, and the semiconductor laser module according to the present embodiment receives the laser light emitted from the front facet 1a of the semiconductor laser device 1 with the optical fiber 2 and transmits the same in the optical fiber 2, as in the conventional semiconductor laser module. However, in the present embodiment, the photo diode 2 receives the optical output reflected at the reflection surface $2a_1$ of the laser light receiving end 2a of the optical fiber 2 and monitors the optical output of the semiconductor laser device 1.

Thereafter, the semiconductor laser module according to the present embodiment controls the optical output of the semiconductor laser device 1 based on the result of the monitoring. Therefore, the semiconductor laser module according to the present embodiment does not need to emit light from the rear facet 1b of the semiconductor laser device 1 as conventionally. Accordingly, in the semiconductor laser module according to the present embodiment, as it is possible to set the reflectance of the rear facet 1b to 95 percent or more, or preferably to 100 percent, it is possible to increase the optical output of the semiconductor laser device 1 and to increase the output of the semiconductor laser module itself.

In this embodiment, as the wedge-shaped lens is provided in the laser light receiving end 2a of the optical fiber 2 and the lens portion is largely slanted, the separation distance between the light emitted form the semiconductor laser device 1 and the above mentioned scattered light to be monitored by the photo diode 3 can be small. Accordingly, the photo diode 3 can be placed in the vicinity of the optical fiber 2 and layout design can be simple, even when, for example, the photo diode 3 is placed with LD chip carrier and so on.

Since the reflection surfaces $2a_1$ and $2a_2$ are provided in the wedge-shaped lens, the light is strongly scattered toward the reflection direction of these surfaces (vertical direction, in this case). Accordingly, the light with sufficient intensity can be monitored by the photo diode placed under the lens.

Further, as this embodiment employs a constitution in which the laser light is coupled directly to the lensed fiber (optical fiber 2) that is provided with the wedge-shaped lens at the laser light receiving end 2a, the collection efficiency of the light form the semiconductor laser device 1 and the output power of the semiconductor laser module can be increased even more.

Further, in the present embodiment, as the shape of the lens at the laser light receiving end 2a of the optical fiber 2 is a wedged shape, it can be processed relatively easy and the laser module can be applied, with good collection efficiency to the semiconductor laser device 1 whose light emission intensity distribution is not isotropic(for example, elliptic).

Figure 3:
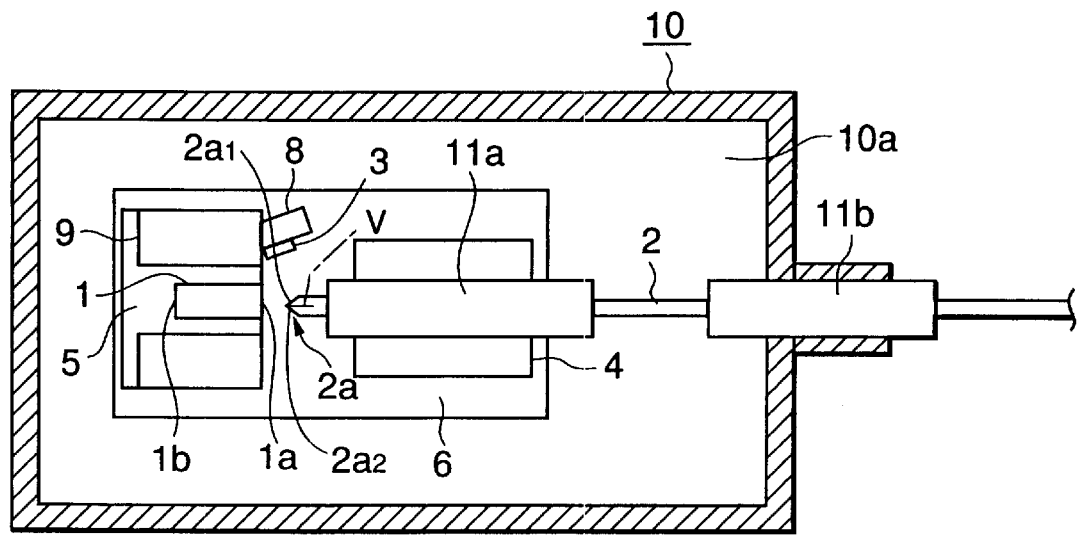
FIG. 3 is a sectional plan view of a semiconductor laser module according to a second embodiment of the present invention.

FIG. 3 shows a sectional plan view of a second embodiment of the semiconductor laser module according to the present invention. In the second embodiment, identical reference numbers are used to indicate parts identical with those in the first embodiment and the explanation thereof is not repeated.

The second embodiment is constituted almost in the same way as the above-mentioned first embodiment. The second embodiment is characterized, as opposed to the first embodiment, in that the optical fiber is placed such that the plane (imaginary plane) V bisecting the wedge angle θ of the wedge-shaped lens of the optical fiber is perpendicular to the base 6, and that, in accordance with this constitution, the photo diode 3 is placed in the vicinity of a flank portion of the laser light receiving end 2a having the wedge-shaped lens.

In the second embodiment, similar to the first embodiment, the slant surfaces of the wedge-shaped lens of the optical fiber 2 is made to serve as the reflection surfaces $2a_1$ and $2a_2$, and the photo diode 3 opposes the reflection surface $2a_1$.

The second embodiment can provide similar effects with similar functions to the first embodiment.

Figure 4:
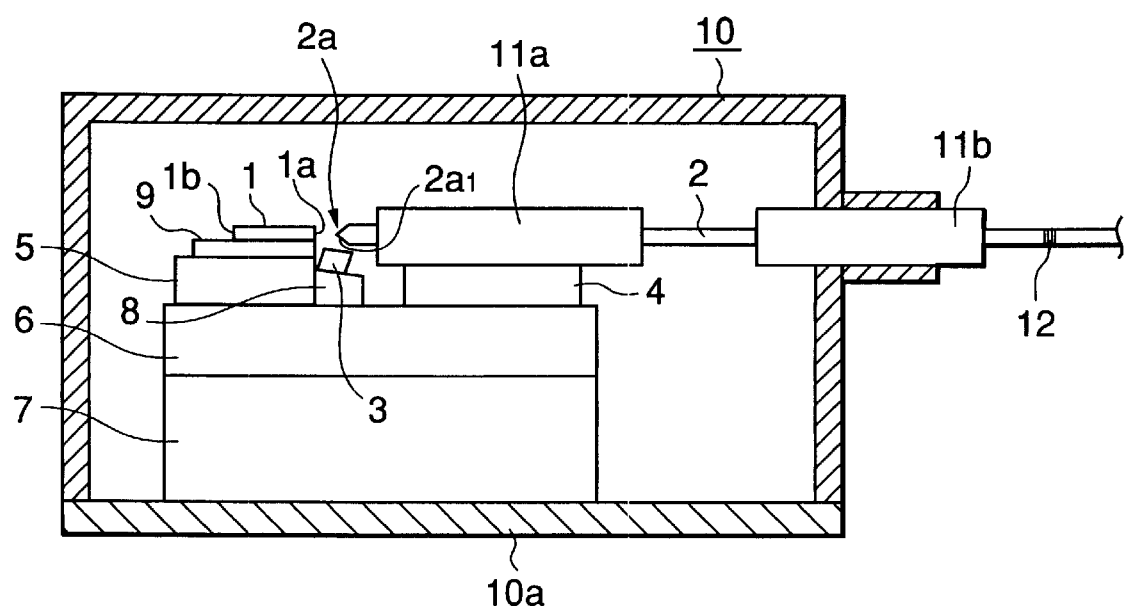
FIG. 4 is a sectional side view of a semiconductor laser module according to a third embodiment of the present invention.

FIG. 4 shows a sectional side view of a third embodiment of the semiconductor laser device according to the present invention In the third embodiment, identical reference numbers are used to indicate the parts identical with those in the first embodiment and the explanation thereof is not repeated.

The third embodiment is constituted almost in the same way as the above mentioned first embodiment, and the third embodiment is characterized, as opposed to the first embodiment, in that a fiber grating 12 is provided on the optical fiber 2. The fiber grating 12 functions as a diffraction grating reflecting only light with a set wavelength out of the light beams that are emitted from the semiconductor laser device 1 and enter the optical fiber 2.

The third embodiment is constituted as described above and the third embodiment can provide similar effects through similar operations to the first embodiment.

Since the semiconductor laser module according to the third embodiment is provided with the fiber grating 12 on the optical fiber 2, the output wavelength of the semiconductor laser module 2 can be stabilized.

Here, when the diffraction grating, like the fiber grating 12 and so on, is provided as in the third embodiment, there exists a possibility of generating return light whose reflected light from the diffraction grating functions in its intensity or whose polarization direction fluctuates. The return light as such causes the optical out put from the semiconductor laser device 1 to fluctuate. However, even in the case, as the amount of the fluctuation of the optical output emitted from the semiconductor laser device 1 toward the optical fiber 2 is smaller than the amount of the fluctuation of the light emitted from the rear facet 1b of the semiconductor laser device, it is easy to conduct the APC control and a stable optical output can be obtained, in the third embodiment.

Figure 5A:
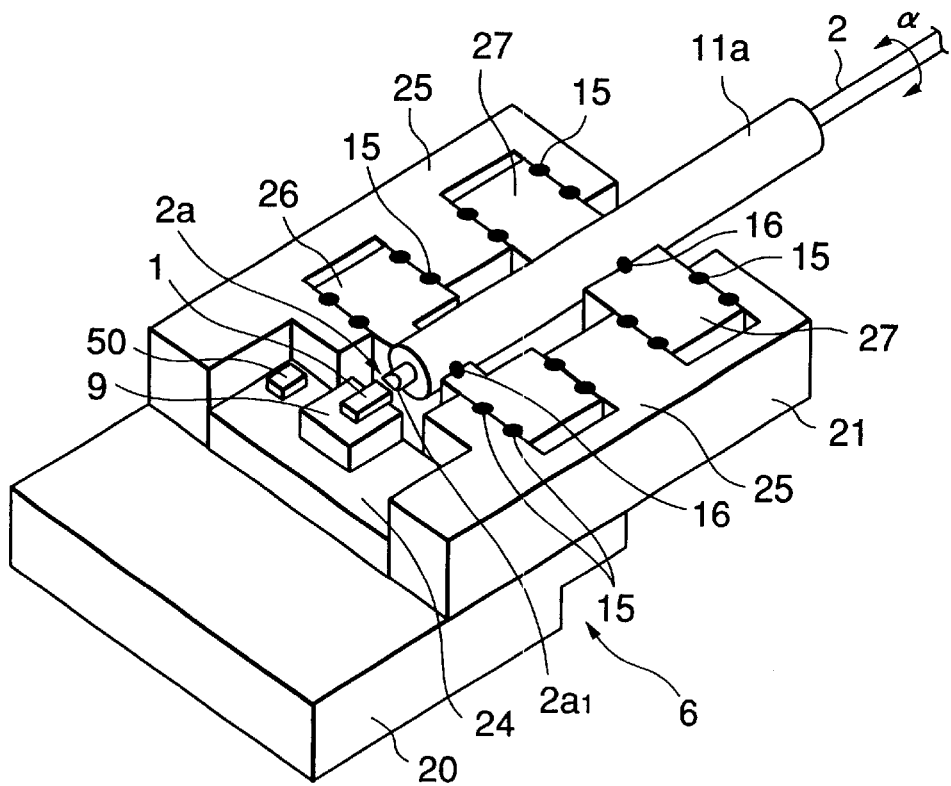
FIG. 5A is perspective view illustrating the constitution of the periphery of a base according to a forth embodiment of the present invention and FIG. 5B is a sectional view illustrating the vicinity of a coupled portion of a semiconductor laser device with the optical fiber according to the forth embodiment of the present invention.
Figure 5B:
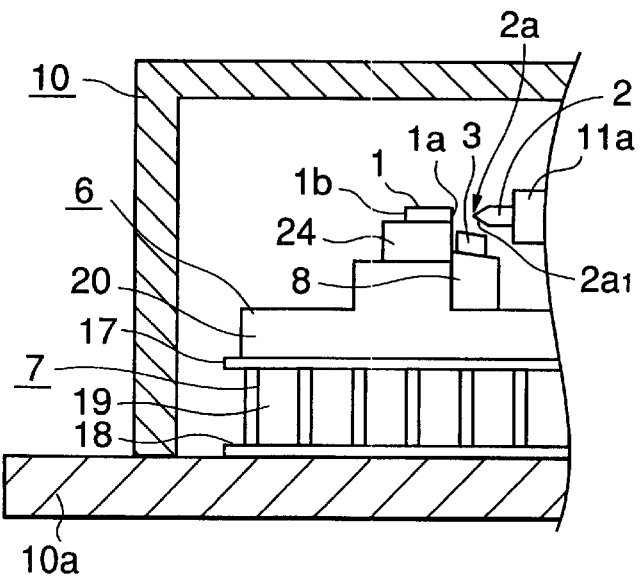

The main constitution of a forth embodiment of the semiconductor laser module according to the present invention is shown in a perspective view in FIG. 5A, and the constitution of a portion in the periphery of the optically-coupled portion between the semiconductor laser device 1 and the optical fiber 2 in the semiconductor laser module according to the forth embodiment is shown as a sectional side view in FIG. 5B.

Here, in the forth embodiment, identical reference numbers are used to indicate the parts identical with those in the first embodiment, and as the constitutions of the semiconductor laser device 1, the optical fiber 2, the package 10 and the ferule 11b in the forth embodiment are identical to those in the embodiment 1, the explanations thereof is not repeated. In the forth embodiment also, as is shown in FIG. 5B, the photo diode 3 is provided in the vicinity of the laser light receiving end 2a of the optical fiber 2 the photo diode 3 is omitted from the illustration of FIG. 5A.

The characteristics of the forth embodiment different from the first embodiment are the constitution of the base 6 and the constitution for fixing the optical fiber to the base 6. In the forth embodiment, the fluctuation of the reflected light at the laser light receiving end 2a of the optical fiber 2 due to the bent of the module is restrained by the following constitution and the constitution is appropriate to prevent the fluctuation of the light monitored by the photo diode 3.

In the present embodiment, the base 6 is constituted so as to comprise a laser device mounting member 20 mounting the semiconductor laser device 1 and a fixing means mounting member 21, and fixing means 26, 27 are mounted on the fixing means mounting member 21. The fixing means 26 and 27 are for fixing the optical fiber 2 via the ferule 11a, and are placed while keeping a distance from each other in the optical axis direction.

As is shown in FIG. 5B, the laser device mounting member 20 is placed on the thermomodule 7 and is in contact with the thermomodule 7, and the thermomodule 7 is mounted on the bottom board 10a of the package 10. The bottom board 10a of the package is made of a CuW10 (the weight ratio of Cu is 10 percent and that of W is 90 percent), which is a Cu—W alloy.

An LD bonding portion 24 that is composed of a common member with the laser device mounting member 20 is mounted on the upper side of the laser device mounting member 20 to constitute a semiconductor laser device mounting region. The semiconductor laser device 1 is mounted on the LD bonding portion 24 via the heat sink (chip carrier) 9. And a thermistor 50, which detects the temperature of the vicinity of the semiconductor laser device 1, is mounted on the LD bonding portion 24. The temperature control by the thermomodule 7 is conducted based on the temperature information from the thermistor 50.

The fixing means mounting member 21 is mounted on the laser device mounting member 20 at a location outside of the semiconductor laser device mounting region, and the fixing means mounting member 21 is fixed on the laser device mounting member 20 using wax or the like.

The fixing means mounting member 21 is made of a Kovar, and the laser device mounting member 20 is made of a CuW10 (the weight ratio of Cu is 10 percent and that of W is 90 percent), which is a Cu—W alloy.

Here, the CuW10 has the thermal conductivity of 180 to 200 (W/m·K) which is ten times higher than that of the Kovar, which is 17 to 18 (W/mK). On the other hand, the Kovar is a metal having low thermal conductivity, good laser-welding property and a coefficient of linear expansion similar to the optical fiber 2.

In the forth embodiment, there are provided the first laser-welded portion 15, which is made by laser-welding the fixing means mounting member 21 as a fixing means mounting portion and fixing means 26, 27, and the second laser-welded portion 16, which is made by laser-welding the fixing means 26, 27 and the ferule 11a. The first laser-welded portion 15 and the second laser-welded portion 16 are formed to have about the same height in the direction perpendicular to the bottom board 10a of the package (the difference between these heights is within ±500 µm, preferably within ±50 µm). Namely, the first and second laser-welded portions 15, 16 are made to align practically on a common plane.

At least on the fixing means 26 side, of the first and second laser-welded portions 15, 16 have almost the same height as the center of the optical fiber (the ridge line at the tip of the lens 2, here).

The alignment between the semiconductor laser device 1 and the optical fiber 2 is done at the time of fixing the ferule 11a at the first and second laser-welded portion 15, 16. For example, to begin with, a side of the ferule 11a close to the semiconductor laser device 1 is aligned, and is fixed to the fixing means 26 at the second laser-welded portion 16. Then the side of the ferule 11a remote from the semiconductor laser device 1 is moved and aligned as is shown as α in FIG. 5A with the second laser-welded portion 16 of the fixing means 26 as a fulcrum utilizing the leverage. Afterward, by fixing the ferule 11a at the second laser-welded portion 16 on the fixing means 27, the optical fiber 2 and the semiconductor laser device 1 are aligned and fixed precisely.

Further, in the forth embodiment, wall portions 25 as a means for preventing warp are provided on the fixing means mounting member 21 of the base 6 on both sides of the frank portions of the optical fiber 2 along the lengthwise direction of the optical fiber 2. The wall portions 25 are for preventing the base from warping, and, in the forth embodiment, stand on the bottom portion of the fixing means mounting member 21 upwardly.

In the present embodiment, the wall portions 25 are provided on the entire region in the lengthwise direction of the fixing means mounting member 21, and the fixing means 26, 27 are provided in grooved regions between the wall portions 25.

The front ends of the wall portions 25 expand toward a region where the LD bonding portion 24 of the laser device mounting member 20 is placed. With this constitution, the wall portions 25 are provided on both sides of the frank portions of the optically-coupled portion interposed between the emitting facet 1a of laser light of the semiconductor laser device 1 and the laser light receiving end 2a of the optical fiber 2, in order to make it possible to restrain the positional displacement of the optically-coupled portion of the semiconductor laser device 1 and the optical fiber 2.

The forth embodiment is constituted as mentioned above, and in the forth embodiment, the optical fiber 2 is placed such that the plane (not shown in the figures) bisecting the wedge angle of the wedge-shaped lens of the optical fiber 2 is parallel to the base 6 and the photo diode 3 is placed on the opposing side of the lower reflection surface 2a of the wedge-shaped lens, as in the first embodiment. Therefore, the forth embodiment can provide effects similar to the first embodiment and a stable and high power output can be obtained.

And in the forth embodiment, the base 6 is composed of the laser device mounting member 20, which is in contact with the base-side board member 17 of the thermomodule 7, and the fixing means mounting member 21 provided thereon. And the laser device mounting member 20 is made of a material having a coefficient of linear expansion (5.8–6.5×10$^{-6}$/K) within a range between the coefficient of linear expansion of the fixing means mounting member 21 (5.3×10$^{-6}$/K) and that of the base-side board 17 (6.5×10$^{-6}$/K) Namely, in the present embodiment, as the laser device mounting member 20 is made of CuW10 having a coefficient of linear expansion within the range between those of Kovar and Al$_2$O$_3$, the warp of the base 6 due to the temperature change of the working environment is relieved, compared to the case where the base 6 made of Kovar is placed on the base-side board 17 made of Al$_2$O$_3$ with direct contact.

And in the present embodiment, as the coefficient of linear expansion of the base-side board 17 and the bottom board-side board 18 (made of Al$_2$O$_3$) is extremely close to that of the bottom board 10a of the package (the difference in coefficient of linear expansion among them is 1.0×10$^{-6}$/K or less), the warp of the bottom board of the package can be prevented.

And the CuW10, which is used to form the laser device mounting member 20, has excellent thermal conductivity, specifically ten times bigger than that of a Kovar. Therefor, with the forth embodiment, the heat generated in the semiconductor laser device 1 can be transferred effectively to the thermomodule 7 side via the heat sink 9 and the laser device mounting member 20, and the semiconductor laser device 1 can be cooled down by the thermomodule 7 effectively.

Further, in the forth embodiment, the first laser-welded portion 15 and the second laser-welded portion 16 are formed to have approximately the same height. Therefore, with the forth embodiment, even when the base warps to a certain extent, the ferule 11a does not make a large positional displacement with the laser-welded portion 15 functioning as a fulcrum by the warp.

Further, in the forth embodiment, by providing the wall portions 25 on both sides of the frank portions of the optically-coupled portion interposed between the emitting facet (front facet) 1a of the laser light of the semiconductor laser device 1 and the laser light receiving end 2a of the optical fiber 2, along the lengthwise direction of the optical fiber 2, the warp of the base 6 at the optically coupled portion of the semiconductor laser device 1 and the optical fiber 2 is restrained.

As mentioned above, with the forth embodiment, as the amount of the deterioration of the optical coupling efficiency between the semiconductor laser device 1 and optical fiber 2 and fluctuation of the amount of the monitoring value of the photo diode can be restrained, even when the temperature of the working environment changes, a semiconductor laser device with even more stable and high power output can be obtained.

Here, the present invention is not limited to the above mentioned embodiments and is applicable to various other models. For example, the shape of the laser light receiving end 2a of the optical fiber 2 is not limited to those mentioned in the above embodiments, and can be conical or spherical. In the case that the laser light receiving end is shaped into a conical or spherical shape, as these shapes are symmetrical with respect to the center axes, the location where the photo diode 3 is placed is not limited to a particular location around the laser light receiving end 2a. Namely, the photo diode 3 can be placed on any suitable location around the laser light receiving end 2a. And the optical fiber 2 is not necessarily limited to a lensed fiber with its front end is processed.

Also, it is preferable for the surface of the laser light receiving end 2a to be coated so that the light is scattered less.

What is claimed is:

1. A semiconductor laser module comprising:
   a semiconductor laser device;
   an optical fiber that receives laser light emitted from said semiconductor laser device through a lens portion formed at a laser light receiving end thereof; and a photo diode for monitoring an optical output of said semiconductor laser device, wherein
said photo diode monitors an optical output of said semiconductor laser device by receiving light reflected at said laser light receiving end of said optical fiber.

2. A semiconductor laser module according to claim 1, wherein
a reflectance at a facet of said semiconductor laser device on the opposite side to said optical fiber is set to 95 percent or more.

3. A semiconductor laser module according to claim 1, wherein
said lens portion is formed into a wedge-shaped lens.

4. A semiconductor laser module according to claim 1, wherein
said optical fiber includes a diffraction grating reflecting only light having a predetermined wavelength out of said laser light emitted from said semiconductor laser device.

5. A semiconductor laser module according to claim 3, further comprising:
a base on which said semiconductor laser device is mounted, wherein
said optical fiber is placed such that a plane bisecting a wedge angle of said wedge-shaped lens is parallel to said base, and
said photo diode is placed under said wedge-shaped lens.

6. A semiconductor laser module according to claim 3, further comprising:
a base on which said semiconductor laser device is mounted, wherein
said optical fiber is placed such that a plane bisecting a wedge angle of said wedge-shaped lens is perpendicular to said base, and
said photo diode is placed on a flank portion side of said laser light receiving end.

7. A semiconductor laser module according to claim 1, further comprising:
a base on which said semiconductor laser device and said optical fiber are mounted;
a fixing parts configured to fix said optical fiber to said base;
a thermomodule on which said base is mounted; and
a package housing said photo diode, said semiconductor laser device, said optical fiber, said fixing parts, said base and said thermomodule, wherein
said thermomodule is mounted on a bottom plate of said package,
said thermomodule includes a base-side plate, a bottom-side plate and a peltier cooler held between said base-side plate and said bottom-side plate;
said base is composed of a semiconductor laser device mounting member in a semiconductor laser device mounting region and in contact with said thermomodule so as to mount said semiconductor laser device, and a fixing parts mounting member is placed outside said semiconductor laser device mounting region so as to mount said fixing parts, and
said semiconductor laser device mounting member is made of a material having a coefficient of linear expansion within a range between a coefficient of linear expansion of said fixing parts mounting member and a coefficient of linear expansion of said base-side plate of said thermomodule.

8. A semiconductor laser module according to claim 1, further comprising:
a base on which said semiconductor laser device and said optical fiber are mounted, wherein said optical fiber is supported by an optical fiber supporting member while being held by a part at both sides thereof to fix said optical fibers to said base; a package configured to house said photo diode, said semiconductor laser device, said base, said optical fiber supporting member, and said fixing parts;
a thermomodule mounted on a bottom plate of said package, wherein said base is mounted on said thermomodule; and
an optical fiber supporting means, wherein
said base includes a fixing parts mounting portion, a first laser-welded portion formed by laser-welding said fixing parts mounting portion and said fixing parts, and a second laser-welded portion formed by laser-welding said fixing parts, and said first laser-welded portion and said second laser-welded portion are configured to have substantially the same heights in a direction perpendicular to said bottom plate of said package.

9. A semiconductor laser module according to claim 1, further comprising:
a base mounting configured to support said semiconductor laser device and said optical fiber;
a fixing parts configured to fix said optical fiber to said base; and
a thermomodule mounting configured to support said base, wherein
said base mounting includes wall portions on both sides of an optically-coupled portion interposed between a laser light-emitting facet of said semiconductor laser device and a laser light receiving-end of said optical fiber.

10. A semiconductor laser module according to claim 1, further comprising:
a base mounting configured to support said semiconductor laser device and said optical fiber;
a thermomodule mounting configured to support said base; and
a package having a bottom plate and configured to house said photo diode, said semiconductor laser device, said optical fiber, said base, and said thermomodule, wherein
said thermomodule is mounted on said bottom plate;
said thermomodule includes a base-side plate, a bottom-side plate, and a peltier cooler held between by said base-side plate and said bottom-side plate, and
a the difference between a coefficient of linear expansion of said base-side plate, said bottom-side plate, said bottom plate is $1\times10^{-6}$/K or less.

* * * * *